US008762360B2

(12) United States Patent
Jiang et al.

(10) Patent No.: US 8,762,360 B2
(45) Date of Patent: Jun. 24, 2014

(54) INTEGRATING APPLICATIONS WITHIN SEARCH RESULTS

(75) Inventors: Li Jiang, Bellevue, WA (US); Milind Mahajan, Redmond, WA (US); Amit Kumar, Redmond, WA (US); Paul Alfred Viola, Seattle, WA (US); Sanaz Ahari, Bellevue, WA (US); Steve Macbeth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 160 days.

(21) Appl. No.: 13/102,536

(22) Filed: May 6, 2011

(65) Prior Publication Data

US 2012/0284247 A1 Nov. 8, 2012

(51) Int. Cl.
*G06F 17/30* (2006.01)
*G06F 7/00* (2006.01)

(52) U.S. Cl.
USPC ............. 707/706; 707/709; 707/712; 706/14; 706/20

(58) Field of Classification Search
None
See application file for complete search history.

(56) References Cited

U.S. PATENT DOCUMENTS

| 7,437,358 | B2 | 10/2008 | Arrouye |
| 7,720,834 | B2 | 5/2010 | Ali |
| 7,774,002 | B1 | 8/2010 | Ortega |
| 8,229,458 | B2 | 7/2012 | Busch |
| 8,396,888 | B2 | 3/2013 | Cheng et al. |
| 8,437,776 | B2 | 5/2013 | Busch |
| 8,487,331 | B2 | 7/2013 | Jang et al. |
| 2003/0236095 | A1 | 12/2003 | Ross |
| 2004/0024846 | A1 | 2/2004 | Randall |
| 2004/0034853 | A1* | 2/2004 | Gibbons et al. ............... 717/174 |
| 2004/0171379 | A1 | 9/2004 | Cabrera et al. |
| 2005/0160107 | A1 | 7/2005 | Liang |
| 2007/0027866 | A1 | 2/2007 | Schmidt-Karaca |
| 2007/0061245 | A1 | 3/2007 | Ramer et al. |

(Continued)

FOREIGN PATENT DOCUMENTS

| EP | 1320270 A1 | 6/2003 |
| EP | 1462999 A2 | 9/2004 |
| KR | 1020100066827 A | 6/2010 |
| KR | 1020110006259 A | 1/2011 |

OTHER PUBLICATIONS

Visual Search—Bing; http://www.bing.com/visualsearch?mkt=en-us&FORM+Z9GE; Nov. 24, 2010; 3 pages.

(Continued)

*Primary Examiner* — Angelica Ruiz
(74) *Attorney, Agent, or Firm* — Dave Ream; Leonard Smith; Micky Minhas

(57) ABSTRACT

Computer-readable media, computer systems, and computing methods are provided for implicitly discovering applications using a query or search results, where the query does not explicitly target a particular application. A search engine is used to receive a user-initiated query and to employ a keyword of the query to generate an initial set of search results. Characteristics of the search results are identified and applications that are relevant to the characteristics are determined. The determination of relevant applications include: accessing an application manifest that manages a mapping between applications and predefined characteristics; comparing the characteristics of the search results against the predefined characteristics of the application manifest to determine a match; and, when a match exists between the search-result characteristics and the predefined characteristics, identifying applications mapped to the matched characteristics as being relevant to the search results. These identified applications are presented in response to the query.

20 Claims, 12 Drawing Sheets

(56) References Cited

U.S. PATENT DOCUMENTS

| | | | |
|---|---|---|---|
| 2007/0067272 | A1 | 3/2007 | Flynt |
| 2007/0088686 | A1* | 4/2007 | Hurst-Hiller et al. ............ 707/4 |
| 2007/0124298 | A1 | 5/2007 | Agrawal |
| 2007/0138268 | A1 | 6/2007 | Tuchman |
| 2007/0156747 | A1 | 7/2007 | Samuelson |
| 2007/0185785 | A1 | 8/2007 | Carlson et al. |
| 2007/0208719 | A1* | 9/2007 | Tran ................................ 707/3 |
| 2008/0288965 | A1 | 11/2008 | Grechanik |
| 2009/0111487 | A1 | 4/2009 | Scheibe |
| 2010/0030624 | A1 | 2/2010 | Vanska et al. |
| 2010/0070342 | A1 | 3/2010 | Hu et al. |
| 2010/0094707 | A1 | 4/2010 | Freer |
| 2010/0100839 | A1* | 4/2010 | Tseng et al. .................. 715/780 |
| 2010/0159943 | A1 | 6/2010 | Salmon |
| 2010/0169841 | A1 | 7/2010 | Singh |
| 2010/0174572 | A1 | 7/2010 | Joseph et al. |
| 2010/0293586 | A1 | 11/2010 | Simoes Rodrigues et al. |
| 2011/0131235 | A1* | 6/2011 | Petrou et al. .................. 707/769 |
| 2011/0173569 | A1* | 7/2011 | Howes et al. .................. 715/835 |
| 2011/0264673 | A1* | 10/2011 | White et al. .................. 707/750 |
| 2011/0276396 | A1* | 11/2011 | Rathod ...................... 705/14.49 |
| 2012/0023088 | A1 | 1/2012 | Cheng et al. |
| 2012/0088487 | A1 | 4/2012 | Khan |
| 2012/0238504 | A1 | 9/2012 | Moyer et al. |
| 2012/0246170 | A1* | 9/2012 | Iantorno ...................... 707/748 |
| 2012/0303455 | A1 | 11/2012 | Busch |
| 2012/0329482 | A1 | 12/2012 | Chandra et al. |
| 2013/0173577 | A1 | 7/2013 | Cheng et al. |

OTHER PUBLICATIONS

Google Search for mobile now includes mobile app results; http://googlemobile.blogspot.com/2010/06/google-search-for-mobile-now; Nov. 24, 2010; 3 pages.

Use Bing Visual Search to Find Windows Phone 7 Applications—US ISV; http://blogs.msdn.com/b/usisvde/archive/2010/11/18/use-bing-visual-search-to-find-windows-phone-1-applications.aspx; Nov. 18, 2010; 1 page.

Information intelligence; http://www.information-age.com/channels/business-applications/features/283621/information-intelligence.thtml; Feb. 18, 2008; 5 pages.

Non-Final Office Action, mailed Jun. 10, 2013, U.S. Appl. No. 13/398,342, pp. 1-13.

Matthias, "Appazaar", Retrieved on: Aug. 31, 2011, 10 pages. Available at: http://www.appazaar.net/.

Appsfire: Hot Apps & Free Apps, Retrieved on: Sep. 1, 2011, 2 pages. Available at: http://www.appbrain.com/app/appsfire%3A-hot-apps-free-apps/com.appsfire.appsfire.

"Hoogsteder, "Google Android Market Goes Local," Retrieved on: Sep. 1, 2011, 3 pages. Available at: http://www.distimo.com/blog/2011_07_google-android-market-goes-local/."

PCT ISR US 2013/025476, m. Jun. 10, 2013 (in US SN 13/398,342), 13 pp.

Notice of Allowance, mailed Nov. 15, 2013, in U.S. Appl. No. 13/398,342, 27 pp.

* cited by examiner

GOURMET CHICKEN PIZZA RECIPE – ALLRECIPES.COM
USER RATING: 4.5/5 – 22 PHOTOS – 521 REVIEWS
PIZZA GETS A LITTLE STYLE WITH CHOPPED TOMATOES REPLACING SAUCE, AND THE ADDITION OF RANCH DRESSING AND SHREDDED CHICKEN
ALLRECIPES.COM/RECIPE/GOURMET-CHICKEN-PIZZA/DETAIL.ASPX – MARK AS SPAM

CHICKEN GARLIC PIZZA RECIPE – ALLRECIPES.COM
USER RATING: 4.5/5 – 11 PHOTOS – 187 REVIEWS
A DELICIOUS OPTION FOR HOMEMADE PIZZA! BUTTER GARLIC SAUCE, CHICKEN, TOMATO, AND RICOTTA AND PARMESAN CHEESES ARE BAKED TOGETHER FOR A DELIGHTFULLY LIGHT PIZZA
ALLRECIPES.COM/RECIPE/CHICKEN-GARLIC-PIZZA/DETAIL.ASPX – MARK AS SPAM

CHICKEN PESTO PIZZA RECIPE – ALLRECIPES.COM
USER RATING: 4.6/5 – 10 PHOTOS – 162 REVIEWS
EASY PIZZA DINNER THAT USES CHICKEN AND PESTO FOR A GREAT MEAL. IF FONTIA IS NOT AVAILABLE AT YOUR STORE, JUST SUBSTITUTE MOZZARELLA.
ALLRECIPES.COM/RECIPE/CHICKEN-PESTO-PIZZA/DETAIL.ASPX – MARK AS SPAM

SHOW ONLY RESULTS FROM ALLRECIPES.COM

LEARN CHICKEN PIZZA RECIPE ON COOKING MAMA
LEARN A DELICIOUS CHICKEN PIZZA RECIPE IN 15 MINUTES. LET COOKING MAMA TEACH YOU HOW TO….
APP://COOKING MAMA/RECIPES/CHICKENPIZZA

CROCKPOT PIZZA CHICKEN RECIPE – SLOW COOKER ENTRÉE POULTRY RECIPES…
CROCKPOT PIZZA CHICKEN IS AN EASY RECIPE. THIS FLAVORFUL CHICKEN BREAST RECIPE IS MADE WITH JUST FIVE INGREDIENTS IN YOUR CROCKPOT INCLUDING PIZZA CHEESE AND PASTA SAUCE.
BUSYCOOKS.ABOUT.COM/OD/CHICKENRECIPE1/R/PIZZACHIX.HTM – MARK AS SPAM

CHICKEN PIZZA RECIPE | GROUP RECIPES
OUR MOST TRUSTED CHICKEN PIZZA RECIPES. REVIEWED BY MILLIONS OF HOME COOKS.

*FIG. 6.*

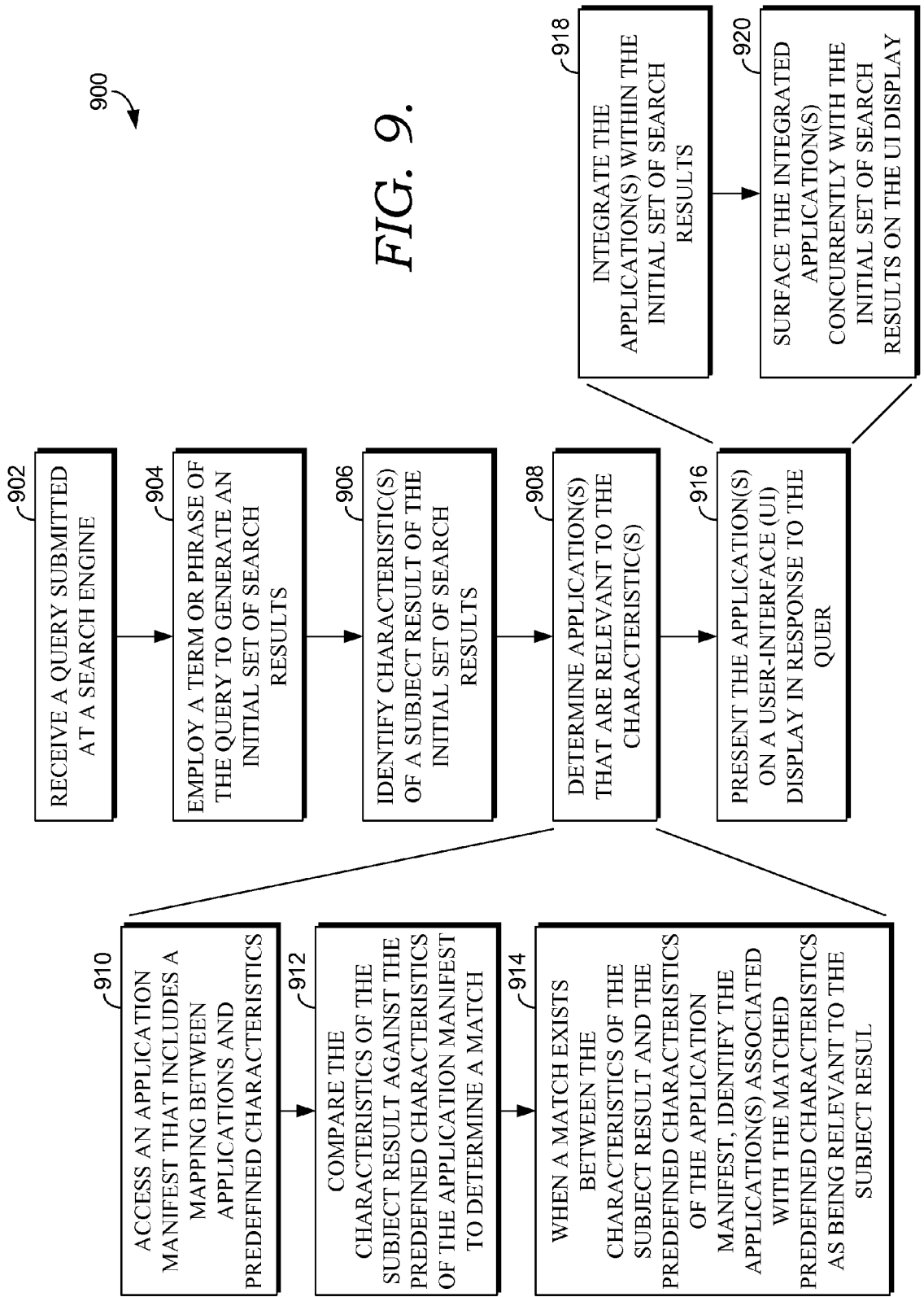

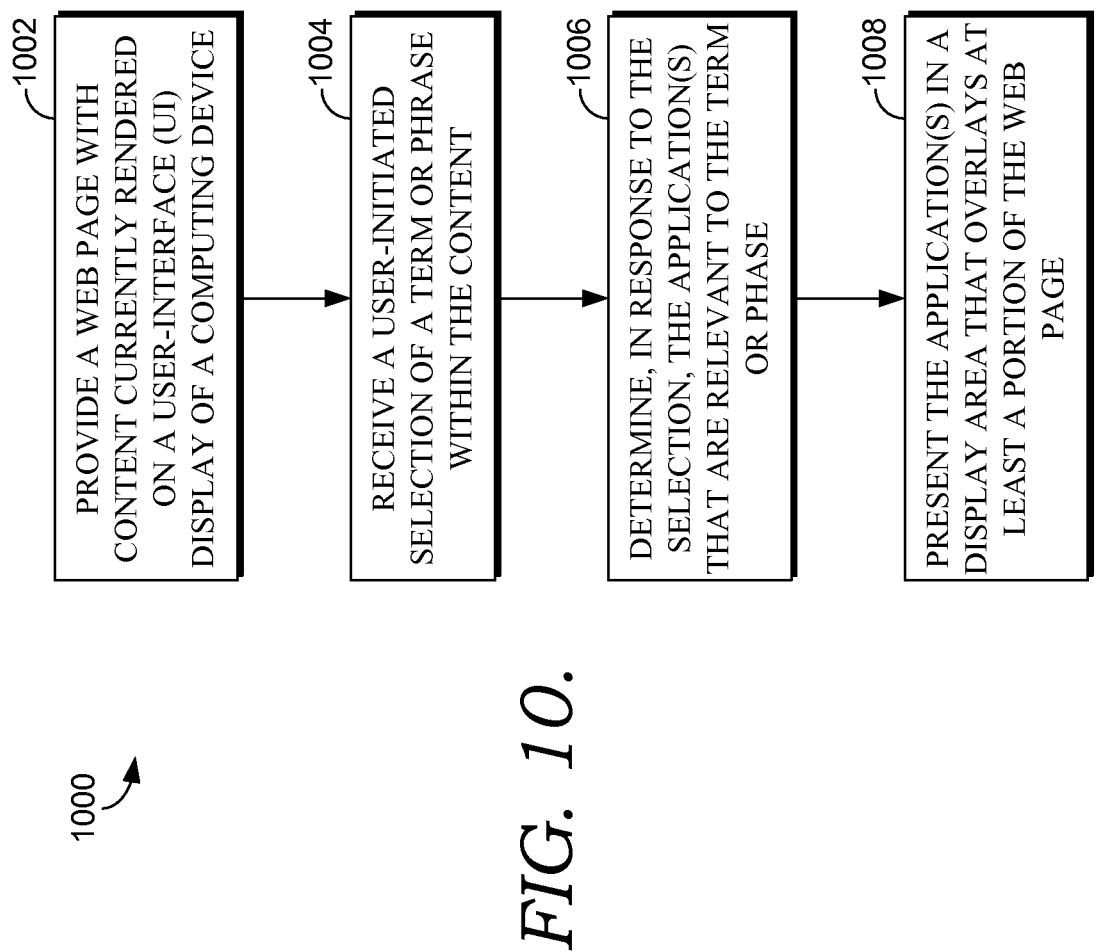

INTEGRATING APPLICATIONS WITHIN SEARCH RESULTS

BACKGROUND

Recent trends have shown that there are more and more applications, or apps, created to fulfill users' tasks. Many of these apps are available at online locations, such as retail websites, in order to offer users an effortless app-shopping experience that may be customized for devices and/or scenarios. For example, various platforms (e.g., Apple®, Android®, and Microsoft®) have had exponential growth in their respective app stores and currently offer over 500,000 aggregate apps for their respective mobile devices. One such exemplary web-centric application is the Yelp® app—the counterpart application to the www.yelp.com website—that is customized to be installed on a variety of mobile devices.

Yet, along with this ever-expanding multitude of apps, there exists a discoverability problem. That is, popular or relevant applications are often hard to discover via online searches. This discoverability problem stems from the standard search protocol of conventional search engines, which surface mainly websites, cards, and answers. This is true for both desktop and mobile devices.

Some search-engine technology provides rudimentary mechanism(s) that allow a user to find applications if an application-index web page (e.g., app store) is being specifically queried by a user via a search engine. Or, there may exist mechanisms can return applications if a user-request is explicitly seeking an app (e.g., "download Yelp® app"). However, when a user-initiated query or request does not explicitly point to applications, the conventional search engines simply return links to websites without consideration of relevant apps. For example, when a user queries "Italian restaurants Bellevue reservation," conventional search engines typically return a number of websites of businesses local to Bellevue, Wash., that serve or cater Italian food. While these search results are generally acceptable, the conventional search engines fall short of entirely satisfying a user's searching intent by failing to discover and present those applications that might help the user more efficiently complete their task(s) underlying the searching intent.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Embodiments of the present application introduce technology for discovering applications that relate to search results generated in response to a query entered by a user and for integrating those applications within the search results to assist the user in fulfilling a pending task. The terms "applications" and "apps" are used interchangeably herein and broadly pertain to application software designed to be executed by an operating system hosted on a computing device and to assist the user in performing a singular or multiple related specific tasks. In operation, apps provide digital solutions in the real world, such as word processing, gaming, communication-based interfaces, etc. Examples of apps include enterprise software, accounting software, office suites, graphics software, and media players. These apps, or application software, as contrasted with operating system software or middleware, which manage and integrate a computer's capabilities, but typically do not directly apply them in the performance of tasks that benefit the user. It should be understood and appreciated that the definition of apps is not limited to the scope of examples provided herein and may include any code that carries out one or more operations when executed.

Initially, embodiments of the present invention involve building and maintaining a registry of apps that may be mapped in some manner to search results. This registry may be persisted in a data store and indexed via an application manifest, which is accessible to search engine(s). Various criteria or attributes of the search results may be used to map the search results to one or more apps. In one instance, an attribute of a search result may be the uniform resource locator (URL) or a uniform resource identifier that directs a user to a website or web page associated with the search result. In another instance, a criterion may be a declaration provided by an app developer that points to a set of individual search results or a category of search results (e.g., entities or entity classes) that are previously deemed relevant to the app. In yet another instance, attributes of the search results may be extracted from the search result's title, description, and/or metadata, while a service may be employed to construct links between these attributes and various apps. That is, in embodiments, terms or phrases from content of a web page may be applied to discover relevant apps, as opposed to simply using terms and phrases from a query. In still another instance, metadata expressed by a search result, such as website capabilities or a predefined correlation to abstract object(s) (e.g., tasks, entity actions, and the like) may be relied on to narrow a field of available apps to those that likely correspond to a user's searching intent.

During a search event (e.g., upon receiving a query at a web browser or other graphical user interface (GUI)), the search engine is enabled to generate search results from the query and compare the search results against the application manifest in order to discover relevant apps. Although the interaction between the search engine and the application manifest, described in more detail below, is provided as an exemplary embodiment throughout, other embodiments of the present invention contemplate leveraging differing technologies for discovering relevant apps. By way of example, a protocol that operates similarly to a domain name server (DNS) technology may be utilized for locating, downloading, and installing applications on the user's device. In this case, the protocol employs terms or phrases parsed from the search result, or underlying website, to conduct an online search for apps (e.g., app database, app catalogue, or app store), or perform a local search within an inventory of installed apps on the user's device.

Upon identifying a group of relevant apps, these apps may be ranked according to any metrics that can be used to sort and/or organize information. Generally, ranking involves ranking apps in relation to other apps using such metrics as popularity of the apps, where popularity may be derived from various sources. These sources used for ranking may include specific services, such as social networks, recommendations from other users, crowd-source ratings, and reviews. Upon establishing the ranking, a threshold that limits the number of apps to the highest ranked apps (e.g., specific level of relevance) may be implemented. In one instance, the threshold is based, in part, upon space allocated on a search-results page for apps.

The highest ranked apps are then placed, or embedded, within the search results (see e.g., FIGS. 5-8). In one embodiment, placement involves presenting a representation of the app proximate to a search result that has parity with the app in order to indicate to the user the rationale for selecting the app. In another embodiment, placement involves exposing the app in a pop-up window on top of content within a web page when a term or phrase is selected within the content. Other embodiments are described herein, which provide non-limiting examples of schemes for surfacing the apps to a user on a GUI.

Upon detecting a user-initiated selection of the app within the displayed search results, one or more actions may occur. For instance, if the app is not recognized as residing within the inventory of the user's device, the search engine may navigate the user to an app store, thereby prompting the user to purchase the relevant app. However, if the app is recognized as being listed in the device's inventory (i.e., previously installed on the device), the search engine may automatically launch the app. In this way, the user is saved the steps of manually locating and starting the app. In an exemplary embodiment, these actions may be offered as options that are visually presented near a representation of the app that is surfaced within the search results.

In the instance that the app is launched from the search results, context of the user's search may be passed from the search engine to the app for current or future use. This context may be passed as parameters that represent various aspects of the user's search, such as content of a search-results page, query keywords, navigation events, link-selection history, user profile data, or other search-behavior information. By way of example, the query keywords "restaurants in Seattle" may be converted into parameters in order to call a launched app (e.g., Yelp® app) to an entry point (e.g., specific feature or task level) that is ostensibly relevant to the user's overarching intent (i.e., planning a dinner in Seattle), as opposed to forcing the user to navigate through the app with the same search criteria previously entered at the search engine.

There are a variety of ways these parameters may be passed from the search engine to the app. In one instance, the parameters may be tailored based on expectations of the app. By way of example, the search engine may be enabled to recognize an appropriate format that each individual app prefers when receiving parameters. The search engine may then perform the appropriate formatting by carrying out certain operations on the query keywords, for example. These operations may include parsing the query keywords into terms and categorizing the terms to correspond with a predetermined input structure of the app. This process of parsing and characterizing enables either the search engine or the app to efficiently populate the appropriate terms into appropriate entry locations of the app's input structure.

Although various different approaches for passing parameters (representing context of a user's search) have been described, it should be understood and appreciated that other types of suitable ways of passing parameters that guide an app to an entry point may be used, and that embodiments of the present invention are not limited to simply parsing, categorizing, and populating as described herein. For instance, if an identifier (ID) of a business is extracted from query keywords that are submitted by a user, a specialized URL associated with the business ID may be discovered and provided to the app, where the specialized URL may guide the app to launch at a entry point relevant to the business being searched.

Upon launching the app at an entry point (e.g., in accordance with context of a user's search), the user may interact with the app for a period of time prior to returning to conduct further searches on the search engine. These interactions may be recorded in a user-interaction log at the app and may be, at some point, passed to the search engine for customizing the user's continued search. For instance, incident to completing a computing session with an app, the app may transfer the user-interaction log to the search engine upon the user returning to the search engine. Once in the possession of the user-interaction log, the search engine may employ some or all the information within the log to help refine the user's experience when conducting additional searches in a number of ways. This refinement may include, in embodiments, the search engine automatically (actively) resubmitting a new query that incorporates information from the log or selectively (passively) using the information from the log to modify subsequent searches.

As such, the technology introduced by embodiments of the present invention allow for expanding on a query to carry out a broad task of searching for apps, for integrating the apps within the search results that are responsive to the query, and, upon launching an app from the search results, for enabling a search engine to pass data to and receive data from the launched app.

BRIEF DESCRIPTION OF THE DRAWINGS

Embodiments of the invention are described in detail below with reference to the attached drawing figures, wherein:

FIG. 6 is a schematic diagram depicting a second illustrative UI display that includes a representation an application surfaced proximate to a relevant search result, in accordance with embodiments of the invention;

FIG. 9 is an overall flow diagram of a method for surfacing one or more applications as a function of search results, in accordance with embodiments of the invention; and FIG. 10 is an overall flow diagram of a method for surfacing at least one application during review of a web page, in accordance with embodiments of the invention.

DETAILED DESCRIPTION

Figure 1:
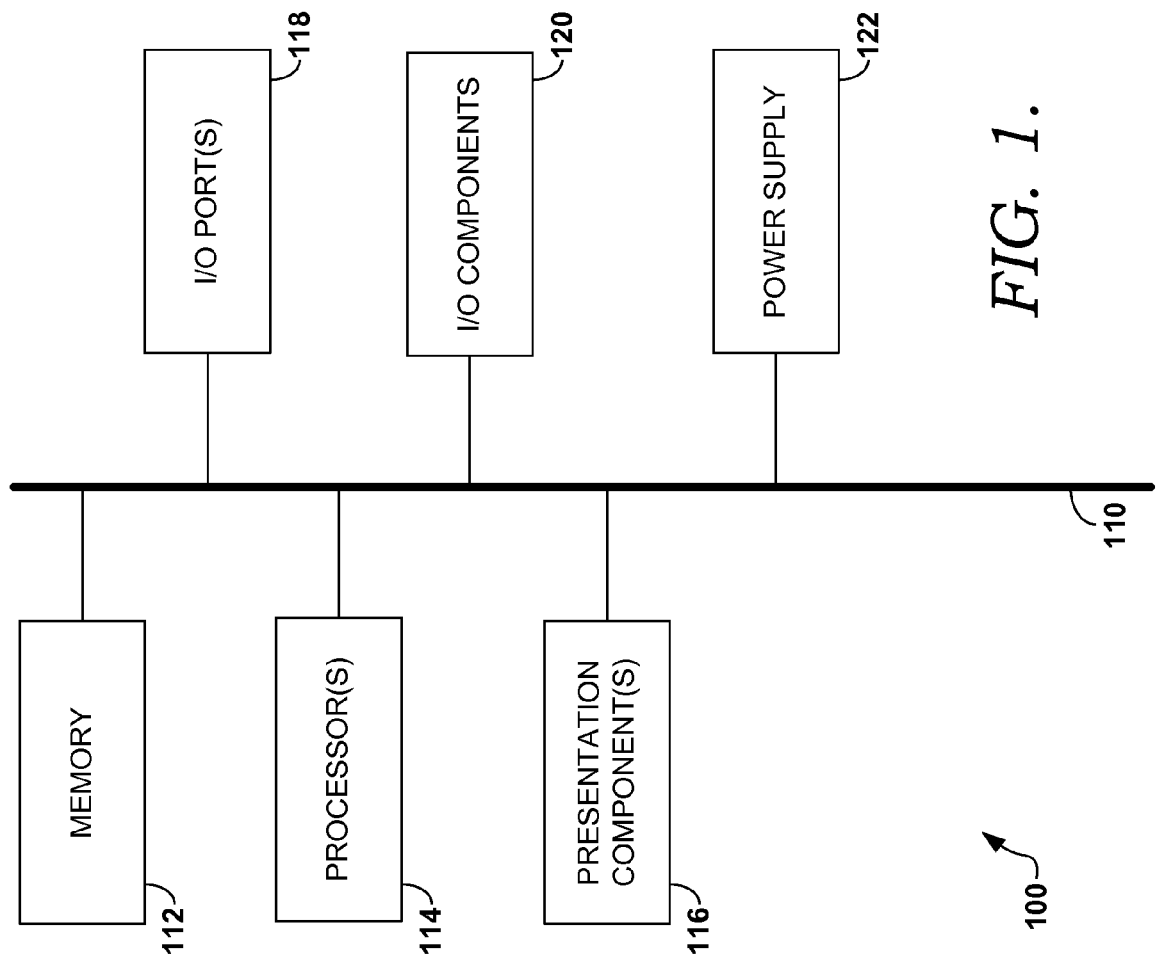
FIG. 1 is a block diagram of an exemplary computing device suitable for implementing embodiments of the invention.

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Generally embodiments of the present invention pertain to employing a search engine to produce search results that are responsive to a query. However, when the query is not explicitly asking for applications, or apps, then conventional search engines typically return websites they deem relevant to the query. For example, if a query includes the keywords "Italian restaurants Bellevue reservation," conventional search engines will likely return a number of websites for local business. Yet, for this query, it is apparent the user's true intent is to find information about Italian restaurants in Bellevue, Wash., and possibly make a reservation. While the websites produced by the conventional search engine may be generally relevant to the query, there could exist a number of apps that might also serve the user's intent more robustly. That is, providing apps within the search results in conjunction with the relevant websites would likely help the user complete their tasks faster. In this case, those apps that would help the user more expediently accomplish their task could be Yelp®, Urbanspoon®, OpenTable®, or any other app that is capable of accepting, making, and confirming reservations. Unfortunately, the conventional search engines fail to surface applications beyond those cases in which users are specifically and explicitly asking for them.

To address this deficiency of conventional search engines, exemplary embodiments of the present invention include configuring search engines to return and surface apps that are relevant to queries that do not explicitly target apps. As a result, providing these apps as part of the search results will potentially help users to complete their tasks faster and with better accuracy.

In one instance, providing apps may be accomplished by leveraging the parity or inherent association between apps and websites. By way of example, a restaurant-focused app may have a significant presence within the content of a website dealing with cooking (e.g., article reviewing the most popular apps for finding a restaurant). As will be described more fully below, search engines of the present invention may be configured to return and surface this restaurant-focused app even when the user's query did not include mention of "apps" or even names of apps. In this way, these search engines may be configured to return relevant apps that implicitly correlate to a user's intent behind a query, without the query explicitly targeting an application.

As can be gleaned from the disclosure above, various embodiments of the present invention involve employing a mapping between apps and search results as well as implementing the mapping to generate search results with apps integrated therein. Often, the search results are generated and surfaced on a user-interface (UI) display through the employment of task-based engines (e.g., decision engines, task engines, individual applications or operations, applet systems, operating systems, and task-based mobile systems), or general systems that allow a user to accomplish tasks by matching apps to user intent. For simplicity of discussion, these engines and/or systems will be hereinafter referred to as "search engines."

These search engines can publish search results that include a representation of app(s), where the app(s) are selected based on the mapping between apps and websites within the search results, for example. For instance, the query "Italian restaurants Bellevue reservation" may prompt the search engine of the present invention to return links to apps for Yelp®, Urbanspoon®, or OpenTable® in-line with the other search results. Upon a user selecting a representation of a particular app, the search engine may then launch the underlying app, if previously installed, and pass the context of the query to the app. Accordingly, the app may be launched to an entry point that takes the user directly to an applet within the app that pertains to the user's task.

Accordingly, one embodiment of the present invention may involve computer-readable media that support the operations of computer-executable instructions thereon. When executed, the computer-executable instructions may perform a method for surfacing one or more applications as a function of search results. In one instance, the method comprises the steps of receiving a query submitted at a search engine and employing a keyword (e.g., term or phrase) of the query to generate an initial set of search results. The method may further comprise identifying characteristic(s) of a subject result of the initial set of search results and determining application(s) that are relevant to the characteristic(s).

This determination of application(s) that are relevant to the subject result's characteristics may include one or more of the following steps: accessing an application manifest that includes a mapping between applications and predefined characteristics; comparing the characteristics of the subject result against the predefined characteristics of the application manifest to determine a match; and, when a match exists between the characteristics of the subject result and the predefined characteristics of the application manifest, identifying the application(s) associated with the matched predefined characteristics as being relevant to the subject result. These identified application(s) may be presented on a user-interface (UI) display in response to the query. In a particular instance, presenting may involve integrating the application(s) within the initial set of search results and surfacing the integrated application(s) concurrently with the initial set of search results on the UI display.

In another embodiment of the present invention, a computer system is established and configured for selecting at least one application using one or more characteristics of search results. Generally, the computer system includes a processing unit coupled to a computer-storage medium, where the computer-storage medium stores a plurality of computer software components that are executable by the processing unit. As described more fully below, the computer software components may include an application manifest, a search engine, a characteristic-matching component, and a selection component. The application manifest serves to persist and provide access to a listing of applications mined from an application marketplace. Typically, the applications within the listing are mapped to predefined characteristics. The search engine is configured for generating an initial set of search results as a function of a query submitted by a user. The characteristic-matching component acts to identify a high-ranking one of the initial search results as a subject result and, in embodiments, to compare characteristics inherent to the subject result against the predefined characteristics of the application manifest. The selection component is provided for selecting application(s) listed in the application manifest that are associated with the predefined characteristics matching the inherent characteristics of the subject result. At some point, the selection component may trigger storing the application(s) as candidates for concurrent display with the initial set of search results.

In yet another embodiment of the present invention, a search engine running on a processor may be provided for performing a method of surfacing at least one application with respect to content of a web page (e.g., online document).

The method may initially involve rendering a web page with content (e.g., text) on a UI display of a computing device. In instances, the method may include the steps of receiving a user-initiated selection of a term or phrase within the content and determining, in response to the selection, the application(s) that are relevant to the term or phase. These relevant application(s) may then be presented in a display area that overlays at least a portion of the web page.

Having described an overview of embodiments of the present invention, an exemplary operating environment in which embodiments of the present invention may be implemented is described below in order to provide a general context for various aspects of the present invention.

The following discussion describes various embodiments of the present invention. Note that several of the exemplary embodiments described below are based on current applications to make the discussion more concrete. However, aspects of the present invention should not be construed as being limited a particular application or platform that offers the particular application. That is, embodiments of the present invention may be designed to be applied to differing platforms (e.g., including PC, iPhone®, and Microsoft Windows®) and other various implementations of an application marketplace.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
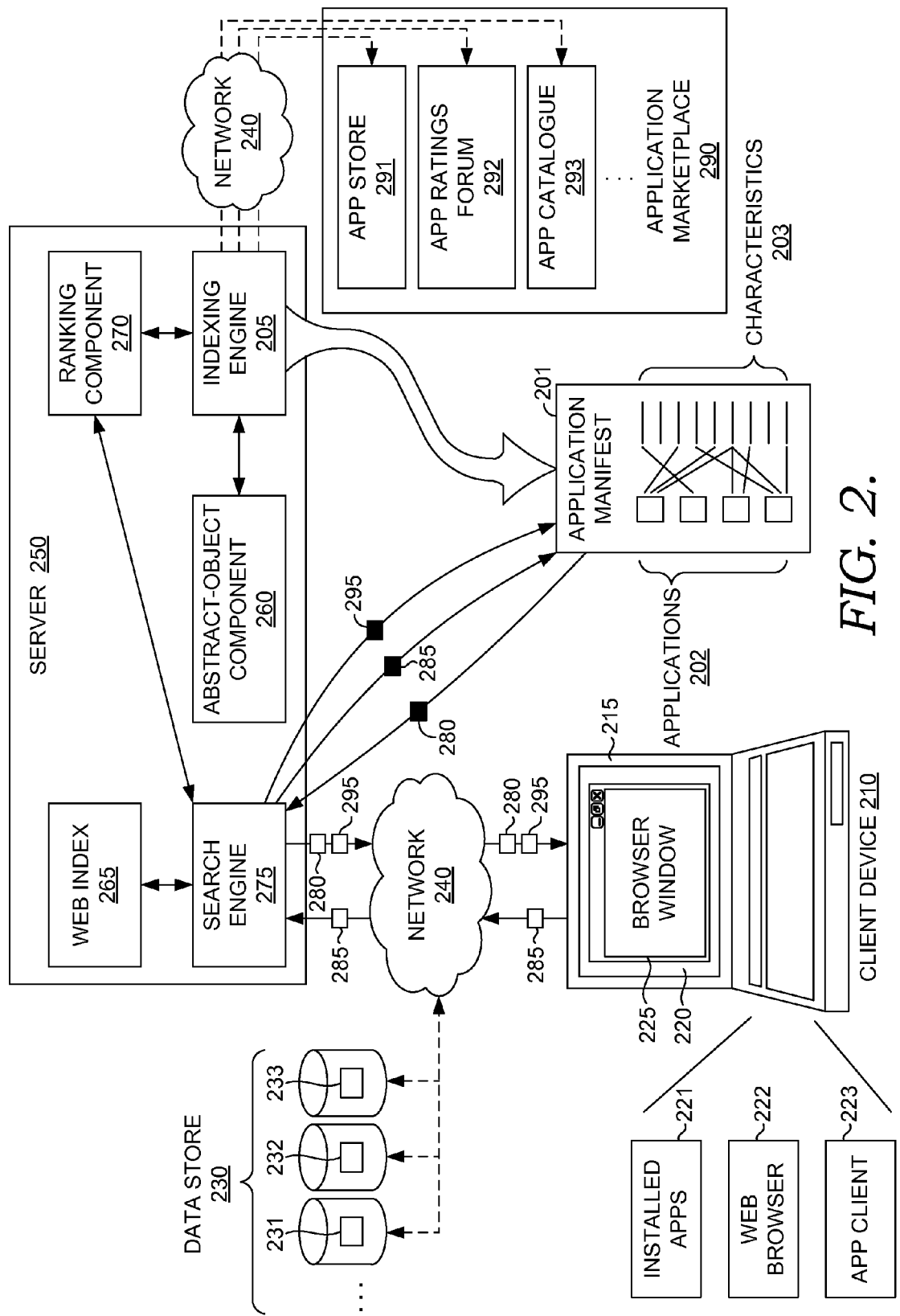
FIG. 2 is a block diagram of an exemplary system architecture of a distributed computing environment configured for use in implementing embodiments of the present invention.

Technology, introduced by embodiments of the present invention, for automatically discovering apps relevant to a query and surfacing on a UI display representation(s) of the relevant apps as part of the search results will now be discussed with reference to FIG. 2. In particular, FIG. 2 depicts a block diagram that illustrates an exemplary system architecture 200 of a distributed computing environment, suitable for use in implementing embodiments of the present invention. Generally, implementing embodiments of the present invention relate to discovering apps in response to an implicit query and presenting those apps as search results to a user (e.g., rendering the apps in-line with websites on a search-result page of a UI display). It should be understood and appreciated that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Initially, the exemplary system architecture 200 includes an application manifest 201, a client device 210, data stores 230, a server 250, an application marketplace 290 and a network 240 that interconnects each of these items. Each of the client device 210, the data stores 230, the server 250, and the application marketplace 290 shown in FIG. 2, may take the form of various types of computing devices, such as, for example, the computing device 100 described above with reference to FIG. 1. By way of example only and not limitation, the client device 210 and/or the server 250 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the devices 210 and 250 includes, or is linked to, some form of computing unit (e.g., central processing unit, microprocessor, etc.) to support operations of the component(s) running thereon (e.g., search engine 275, indexing engine 205, and the like). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 210 and 250 to enable each device to perform communication-related processes and other operations (e.g., accessing the data store 230 or discovering apps 202 within the application manifest 201). In another instance, the computing unit may encompass a processor (not shown) coupled to the computer-readable medium accommodated by each of the devices 210 and 250.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the devices 210 and 250. Generally, resources refer to software components or hardware mechanisms that enable the devices 210 and 250 to perform a particular function. By way of example only, the resources accommodated by the server 250 may include one or more of the following: an indexing engine 205; an abstract-object component 260; a web index 265; a ranking component 270; and the search engine 275.

The client device 210 may include an input device (not shown) and a presentation device 215. Generally, the input device is provided to receive input(s) affecting, among other things, a presentation of the search results in a browser window 225 surfaced at a UI display area 220. Illustrative devices include a mouse, joystick, key pad, microphone, I/O components 120 of FIG. 1, or any other component capable of receiving a user input and communicating an indication of that input to the client device 210. By way of example only, the input device facilitates entry of a query and controls the location of a selection tool (e.g., mouse pointer) hovering over the search results that are responsive to the query.

In embodiments, the presentation device 215 is configured to render and/or present the UI display 220 thereon. The presentation device 215, which is operably coupled to an output of the client device 210, may be configured as any presentation component that is capable of presenting information to a user, such as a digital monitor, electronic display panel, touch-screen, analog set top box, plasma screen, audio speakers, Braille pad, and the like. In one exemplary embodiment, the presentation device 215 is configured to present rich content, such as the browser window 225 that includes a display area populated with search results (e.g., digital images). In another exemplary embodiment, the presentation device 215 is capable of rendering other forms of media (e.g., audio signals). In yet another exemplary embodiment, the presentation device 215 may present a portion of the search results (e.g., descriptions of and links to websites) in proximity with representations of apps, as more fully discussed below.

The data store(s) 230 are generally configured to store information associated with a user-submitted query and/or data generated from previous query results and user interaction therewith, discussed below. In various embodiments, such information may include, without limitation, recorded search behavior 231 (e.g., query logs, related searches list, etc.) of society in general, a log 232 of a particular user's tracked interactions with the search engine 275, and other information 233 that pertains to embodiments of the present invention. In addition, the data store(s) 230 may be configured to be searchable for suitable access of the stored information. For instance, the data store(s) 230 may be searchable for one or more user-initiated queries previously entered or currently pending. It will be understood and appreciated by those of ordinary skill in the art that the information stored in the data store(s) 230 may be configurable and may include any information relevant to the execution of the search engine 275. The content and volume of such information are not intended to limit the scope of embodiments of the present invention in any way. Further, though illustrated as single, independent components, the data store(s) 230 may, in fact, be a plurality of databases, for instance, a database cluster, portions of which may reside on the client device 210, the server 250, another external computing device (not shown), and/or any combination thereof.

This exemplary system architecture 200 is but one example of a suitable environment that may be implemented to carry out aspects of the present invention and is not intended to suggest any limitation as to the scope of use or functionality of the invention. Neither should the illustrated exemplary system architecture 200 be interpreted as having any dependency or requirement relating to any one or combination of the client device 210, the data stores 230, the server 250, the application marketplace 290, and components 205, 260, 265, 270, and 275, as illustrated. In some embodiments, one or more of the components 205, 260, 265, 270, and 275 may be implemented as stand-alone devices. In other embodiments, one or more of the components 205, 260, 265, 270, and 275 may be integrated directly into the server 250, or on distributed nodes that interconnect to form the server 250. It will be understood by those of ordinary skill in the art that the components 205, 260, 265, 270, and 275 (illustrated in FIG. 2) are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and, metaphorically, the lines would more accurately be grey or fuzzy. Further, although some components of FIG. 2 are depicted as single blocks, the depictions are exemplary in nature and in number and are not to be construed as limiting (e.g., although only one presentation device 215 is shown, many more may be communicatively coupled to the client device 210).

Further, the devices of the exemplary system architecture may be interconnected by any method known in the relevant field. For instance, the server 250 and the client device 210 may be operably coupled via a distributed computing environment that includes multiple computing devices coupled with one another via one or more networks 240. In embodiments, the network 240 may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components 205, 260, 265, 270, and 275 are designed to perform a process that includes, at least, the steps of receiving a query 285 from a web browser 222 running on the client device 210, generating search results 295 that are responsive to the query 285, inspecting the application manifest 201 with characteristics 203 of the search results 295 to identify apps 202 mapped thereto, and sending relevant apps 280 to the web browser 222 for presentation at the browser window 225 as part of the search results 295. Initially, as illustrated in FIG. 2, the application manifest 201 typically includes a mapping between apps 202 and characteristics 203 of websites. These characteristics 203 may involve any known attributes of websites that may be identified for use in digitally linking those websites to the apps 202, as more fully discussed below.

In embodiments, the indexing engine 205 is responsible for constructing and maintaining the application manifest 201. By way of example, constructing the application manifest 201 may involve crawling the application marketplace 290 for available apps 202 and associating the apps 202 with websites using characteristics 203 of the websites. Crawling the application marketplace 290 may comprise mining applications from such sources as an app store 291, an app ratings forum 292, and/or an app catalog 293. It should be understood and appreciated that other sources for accessing applications may be used, and the illustrated sources 291-293 do not represent an exhaustive listing. Further, the application marketplace 290 may vary based on an applications platform (e.g., Microsoft® Apps, Android®, and the like) running on the client device 210.

Constructing the mapping between the apps 202 and the characteristics 203 may involve defining or distilling properties of particular websites. For instance, a web address, such as a uniform source identifier (URI) and/or uniform source locator (URL), may be used as the characteristics 203 that link applications to websites, when the applications and the websites exhibit parity therebetween. As used herein, the term "parity" broadly relates to an association between one or more applications and one or more websites based on a common task performed, corresponding online service provider, and/or similar underlying program or functionality. These applications and websites that exhibit parity are considered to be directly relevant such that, in embodiments, the mapping between these applications and websites may be derived from content of the website's URL. This content of the URL (e.g., characteristics 203 of the website) may then be linked to an application (e.g., apps 202 of the application manifest 201) having a name or descriptor that resembles some or all of the URL's content.

Figure 8:
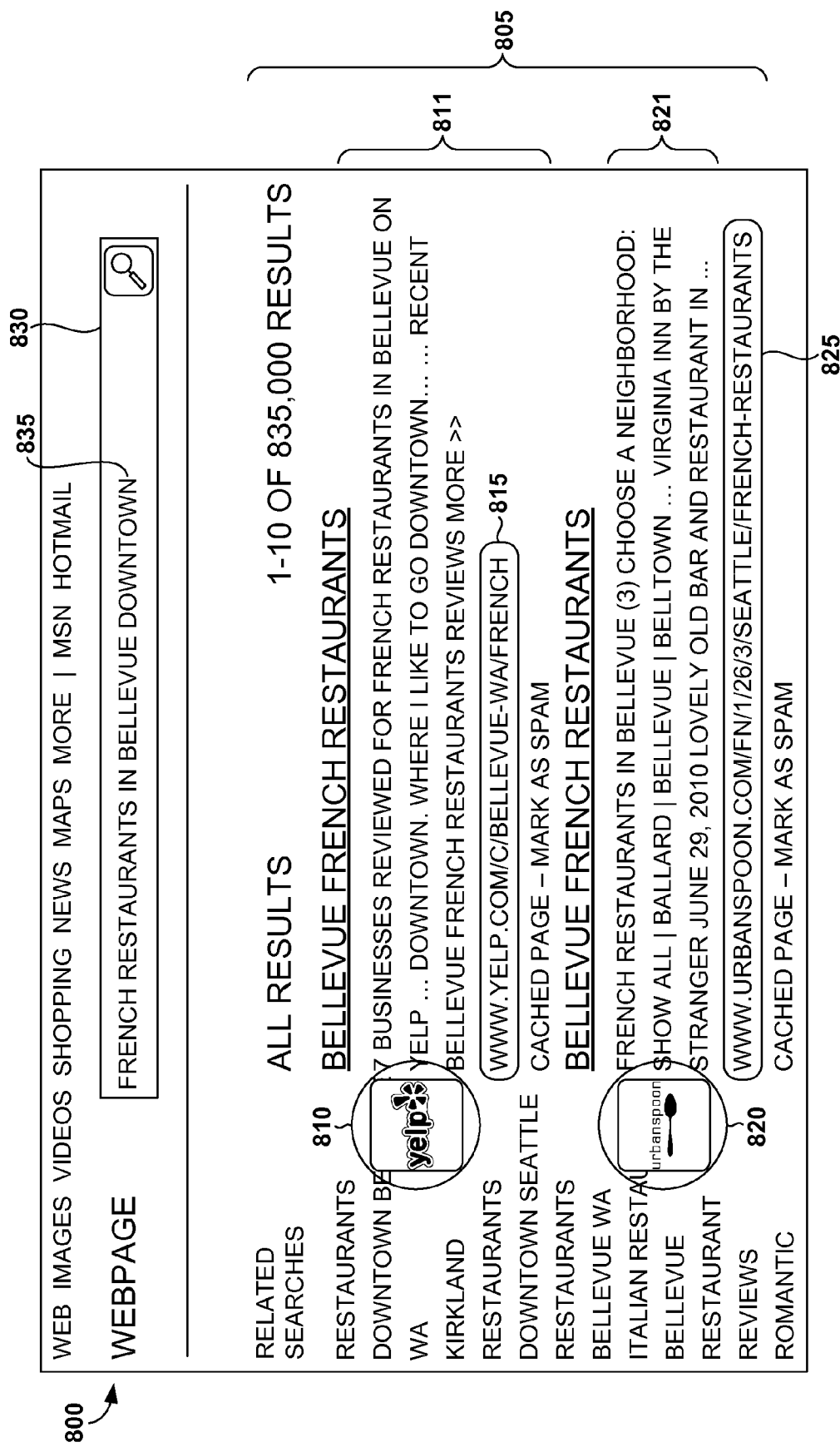
FIG. 8 is a schematic diagram depicting a fourth illustrative UI display that includes representations of applications that exhibit parity with respective search results, in accordance with embodiments of the invention.

In one example, as illustrated in an exemplary UI display 800 of FIG. 8, from the URL or web address "www.urbanspoon.com" 825, the indexing engine can infer that the Urbanspoon® application 820 will exhibit parity with a website 821 having the web address "www.urbanspoon.com." Consequently, the Urbanspoon® application 820 will likely be directly relevant to a query 835 (e.g., "Italian restaurants Bellevue reservation") that generated search results that include the website 821 having the web address 825 "www.urbanspoon.com." As such, upon determining that the website 821 having the web address 825 "www.urbanspoon.com" is listed in the search-results page 805, the Urbanspoon® application 820 is selected from the application manifest 201 (i.e., the search engine 275 comparing the web address 825 against the predefined characteristics 203 to find one or more matching apps 202) as a candidate app to be returned to the user in-line within the search-results page 805. Moreover, if a website (e.g., website 811 that includes the web address 815) that exhibits parity with the candidate app (e.g., application 810 Yelp®) is listed towards the top of a search-results page 805 presented at the UI display 800, then there is a strong indication that the candidate app is useful to complete the user's tasks. The ranking component 270 may consider this placement of the website, with respect to other websites within the search results, when determining whether to select the candidate application for incorporation within the search results.

In another embodiment, an application may be determined to be relevant to a query when the application is expressly related to a website discovered in response to the query. This express relationship between an application and a web address occurs when a website that includes metadata (e.g., name, description, or other content) pointing to the application. Further, this express relationship may be stored and updated via mappings in the application manifest 201. For example, an application entitled Doodle Jump® may be expressly related to an app-review website that has the web address http://www.148apps.com/reviews/doodle-jump because the application's name is mentioned within the content of the app-review website's URL. As such, a query that generates search results having this app-review website listed therein will likely invoke the discovery and display of the relevant Doodle Jump® application within the search results. In embodiments, as discussed more fully below, a portion of an article posted at the app-review website discussing the Doodle Jump® application may be surfaced in the search results 295 to portray the search engine's 275 rationale for selecting the Doodle Jump® application and, further, to assist the user with making an informed decision as to whether to download or launch Doodle Jump® application.

It should be understood and appreciated that any content within a website may be used as the characteristics 203 for mapping against apps 202, and that embodiments of the present invention contemplate a variety of alternative sources within, or associated with, a website for extracting content to be transformed into website characteristics 203. For instance, an application may be virtually linked with a first website whose content includes just a link to a second website that posts the actual discussion (e.g., review article of apps) mentioning the application.

In a variant embodiment of using web addresses to discover applications, the URL's of the search results may be shortened to encompass a broader range of applications. Initially, the characteristics 203 within the application manifest may represent truncated URL's that typically point to a website without referencing a particular web page or sub-location therein. Consequently, upon receiving the query, the websites identified at the web index 265 as being responsive to the query 285 are normalized. Typically, normalizing involves modifying the URL of each website from a specific page locator to a generic site locator. The search engine 275 may then compare the generic site locator, or normalized URL, against the truncated URL's of the application manifest to determine a match. Upon comparison, the apps 202 mapped to the matching truncated URL's are identified and designated as candidates for presentation alongside the search results 295.

Returning to the application manifest 201, applications that are indirectly relevant to a given query may be mapped based on matching capabilities of the application with an overarching concept or goal of the website. For example, if the search results include a website for a restaurant (e.g., http://seastarrestaurant.com), this website can be mapped against the Urbanspoon® application based on the indexing engine's 205 understanding that the content of the restaurant website references or pairs with capabilities of the Urbanspoon® application. In a particular instance, the restaurant website may include a review of the Urbanspoon® application, which would generate the user's interest in testing the Urbanspoon® application. Or, in another instance, the restaurant website might suggest an interesting diner, while the Urbanspoon® application would allow the user to make reservations at that diner.

In another example of employing the application manifest 201 to identify applications that are indirectly relevant to a query, the user's query or queries within a search event might be related to an entity. The abstract-object component 260 may have access to predefined entities and may manage the mapping of these entities to applications. In operation, entities are used to find relevant applications that share a similar concept.

As used herein, the term "entity" generally refers to an abstract object that cannot be adequately managed through keywords. That is, abstract objects consider the context of a user's search event, which exposes the user's true intent, as opposed to employing just keyword-matching techniques, which do not always target the user's intent. Accordingly, entities may be logical objects that may be represented by a particular online description. These logical objects may be a person, place, thing, or any combination thereof. For instance, some examples of logical objects are the following: a particular movie; a restaurant on Castro Street in the city of Mountain View, Calif.; the CEO of Microsoft®; the Alaska Airlines' flight #AS331 from San Jose to Seattle; or a digital camera.

Typically, predefined entities may be indexed within the application manifest 201 as characteristics 203 that may be interrogated with one or more entities related to an ongoing search event. In practice, a user conducting the search event (e.g., comprising at least one user-initiated query and/or at least selection of a search result) may wish to target a particular movie, for example, rather than a book or other product with a similar name. The search engine 275 may derive the entity corresponding to the targeted movie from the search event and convey the derived entity to the abstract-object component 260 that, in turn, compares the derived entity against predefined entities within the application manifest 201. Upon finding a match, the abstract-object component 260 may then identify the apps 202 mapped to the matching predefined entity and designate the identified apps 202 as candidates for presentation within the search results 295. In this way, the search engine identifies apps 202 that are relevant to the user's true intent, and avoids placing in the search results those applications that share keywords with the query but fail to share a common concept.

In an example of using entities, an example query 285 may include the keywords "Seattle to Boston." Based on the subject matter of the query 285 and/or other queries within an ongoing search event, the search engine 275 may determine that the user's intent is to book a flight. Accordingly, the search engine 275 may select a travel-based entity to be associated with the ongoing search event and, via interaction with the web index 265, identify websites that are related to air travel. Further, the search engine 275 may communicate the travel-based entity and/or pass the air-travel-related websites to the abstract-object component 260. In response, the abstract-object component 260 may examine the application manifest 201 with the travel-based entity and/or air-travel-related websites to find one or more predefined entities and/or websites, respectively, that match. The apps 202 mapped to the matching predefined entities and/or websites are designated as candidates for display and are then ranked by the ranking component 270. The highest-ranked candidates (e.g., based on number of purchases, popularity, or the app ratings forum 292) are then returned as apps 280 to the search engine 275 for incorporation within the search results 295. Thus, although the keywords "Seattle" and "Boston" are likely nowhere within the metadata of the apps 280, the apps 280 are determined to be relevant, via the use of entities, to the query and satisfy the user's intent of the search event even more so than applications that do include the keywords within their metadata.

In another embodiment, the characteristics 203 of the application manifest 201 relate to the query 285, as opposed to search results 295 or a predefined entity managed by the abstract-object component 260. In this embodiment, metadata within the apps 202 may be predetermined to be implicitly related to one or more keywords of a query. Accordingly, the mapping in the application manifest 201 may capture and expose this implicit relationship between the apps 202 and the keywords. In operation, when the query 285 is received by the search engine 275, the query 285 is parsed to extract the keywords therefrom and compared against the keywords within the application manifest 201 to discover apps 202 mapped thereto.

In yet another embodiment, the characteristics 203 of the application manifest 201 may involve catalogued keywords that pertain to a common concept, task, or intent. In one example, the catalogues may be developed by a third party, such as an app developer or the app store 291. In another example, the catalogues may be derived directly from search terms associated with the online app catalogue 293 accessible within the application marketplace 290. In operation, upon receiving the query 285, the term(s) or phase(s) of the query 285 may be implicitly matched against the catalogues to determine the apps 202 being referenced.

In still another embodiment, the characteristics 203 of the application manifest 201 may pertain to tasks that the user is currently performing while conducting a search event. Typically, a task may be distilled from or generally represent a sequence of user-actions (e.g., link selections, dwell times, previous queries, and/or other interactions with the web browser 222) carried out during the search event. In particular, the user-actions taken by the user may be logged by the search engine 275 and stored at the data store 230 of FIG. 2. The abstract-object component 260 may inspect the logged user-actions at the data store 230 and, upon analysis, target an appropriate task that encompasses the goal of the user-actions. This task may be compared against the characteristics 203 of the application manifest 201 to determine those apps 202 that are mapped to the task.

Although various types of characteristics 203 employed for mapping the query 285 and/or websites of the search results 295 to apps 202 have been described, it should be understood and appreciated that other types of suitable characteristics 203 that implicitly or conceptually describe an application may be used, and that embodiments of the present invention are not limited to those characteristics 203 discussed above. For instance, beyond using entities derived from the search event and predefined for the apps in the application manifest 201, the search engine 275 may distill other information from the query 285, the search results 295, and/or the ongoing search event, such as overall tasks the user is attempting perform (e.g., plan a night out in Seattle) or actions the user is attempting to carry out (e.g., search for a song or artist).

With reference to FIGS. 3 and 4A-4C, the functionality of an exemplary system architecture 300 will now be discussed. Initially, the operational flow diagram of FIGS. 4A-4C introduces a technique for discovering apps related to search results and/or relevant to a query without the query explicitly targeting the apps, as implemented by the exemplary system architecture 300 shown in FIG. 3. It should be noted that like reference numerals identify like components in the various figures, such as the web browser 222 of FIGS. 2, 3, and 4A-4C.

As illustrated, the search engine 275 is configured to discover apps 202 for queries 285 with an implicit intent to produce applications within the search results 295. One way to achieve discovery of apps 202 is for the search engine 275 to leverage the web sites that are responsive to the query 285 to decide what applications are relevant and should be returned, as discussed above. Accordingly, other indicators (e.g., characteristics 203 of web sites within the application manifest 201) may be used to discover apps 202 without the explicit wording included in the query 285 itself. In order to implement this process, the search engine 275 may rely upon various components 276, 277, and 278 that are responsible for managing sub-processes having defined operations, as discussed with respect to FIGS. 4A-4C below.

The process for discovering relevant apps 202 typically commences upon a user-initiated query 285 being received at the web browser 222. For example, the query 285 may be received upon entry into a search box of a toolbar or browser window 225 of a UI display 220 (see FIG. 2). Upon submission of the query 285 to the web browser 222 or any other application designed to access the Internet, the query 285 is conveyed to the search engine 275. As depicted at operation 405, terms or phrases 401 may be extracted from query 285. These terms or phrases 401 may be communicated in a request to retrieve search results from a web index 265 (see FIG. 2). In reply to the request, the web index 265 may return to the search engine 275 search results 295 that are responsive to the query 285. As depicted at operation 410, the search engine 275 may identify characteristics 310 inherent to the initial set of search results 295.

Once these characteristics 310 are identified from the search results 295 (e.g., URL's are generic site locators of websites), apps 280 relevant to the inherent characteristics 310 of the search results 295 are determined by employing the characteristics 310 to inspect the application manifest 201. A characteristic-matching component 276 (see FIG. 3) may be provisioned within the search engine 275 to inspect the application manifest 201 by comparing the characteristics 310 against the predefined characteristics 203 to find a matching app 280 as depicted at operation 420. As mentioned above, the indexing engine 205 of FIG. 2 is provided to mine apps 202, and to construct and maintain the mapping between the mined apps 202 and the predefined characteristics 203. In instances, the predefined characteristics 203 may comprise abstract objects that describe a respective intent of a user when implementing a search event.

In an exemplary embodiment, the characteristic-matching component 276 may identify a high-ranking one of the initial search results 295 as a subject result, and interrogate the subject result against the predefined characteristics 203 of the application manifest 201. This embodiment effectively limits the discovered apps 280 to those that are deemed highly relevant to the query 285. In other embodiments, as discussed above, qualities of the query 285 may be abstracted and directly used to discover relevant apps without the consideration of the search results 295. In still other embodiments, relevant apps arrived upon from separate streams of logic (e.g., the search results 295 and the implicit qualities of the query 285) may be joined via a selection component 277 to surface those applications 330 that are determined to be most useful to the user's search intent.

As depicted at operation 425, top-rated applications 330 may be selected from the relevant apps 280 by implementing the selection component 277. In one instance, the selection component 277 is configured for selecting relevant app(s) 280 returned from the characteristic-matching component 276 and for storing the app(s) 280 as a candidates for concurrent display with the initial set of search results 295. In another instance, as depicted at operation 425, the selection component 277 may be responsible for narrowing the relevant apps 280 to top-rated applications 330 by interacting with the ranking component 270. The ranking component 270, as more fully discussed above with reference to FIG. 2, serves to organize the relevant apps 280 based on one or more rating schemes and to limit the applications surfaced within the search results 295 based on at least one predefined threshold.

Figure 3:
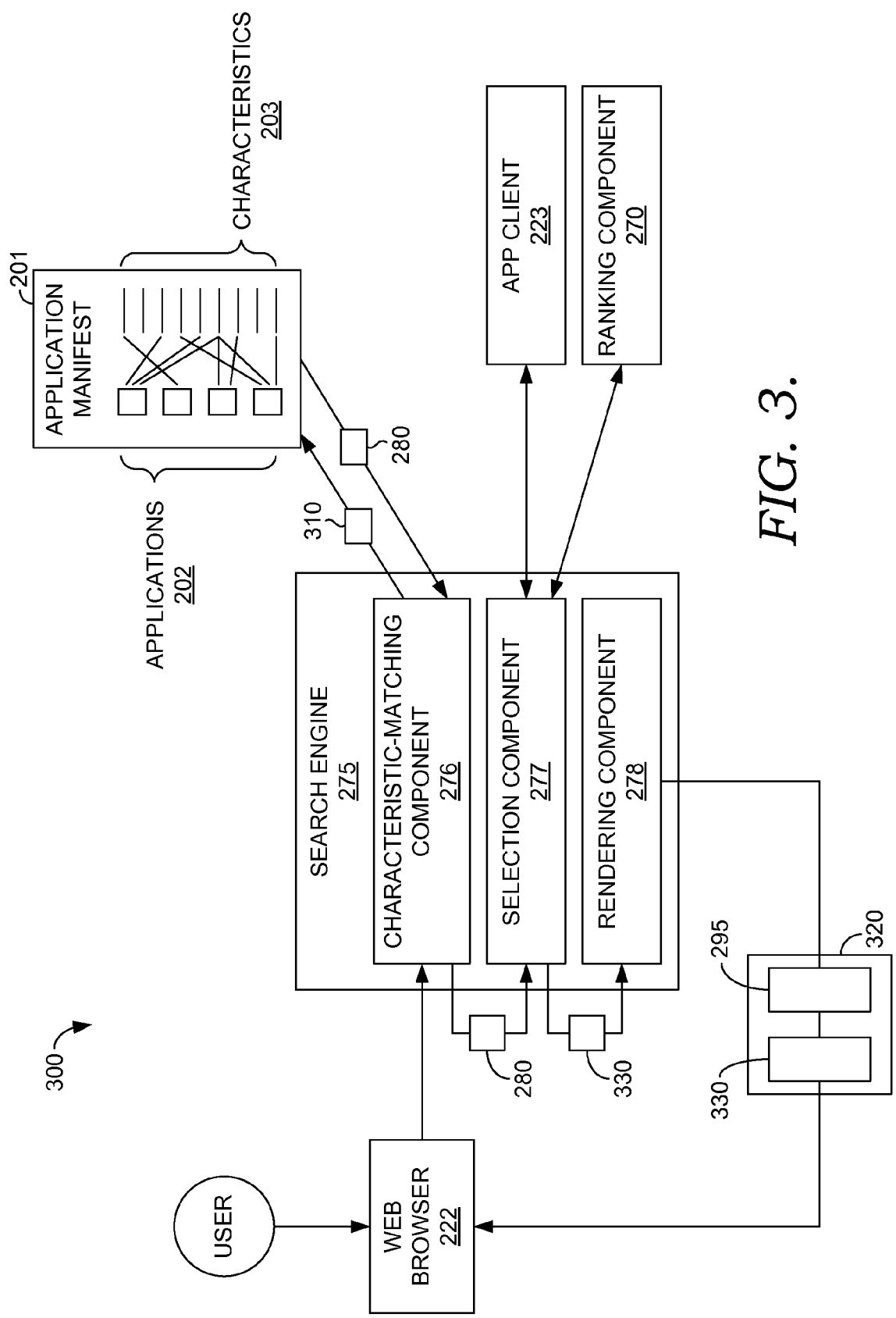
FIG. 3 is a block diagram of an inter-component communication scheme within the exemplary system architecture of FIG. 2, in accordance with embodiments of the present invention.

In yet another instance, the selection component 277 may interface with the app client 223 running on the client device 210, as illustrated at FIG. 3. The app client 223 may have access to the apps 221 installed at the client device (see FIG. 2). Accordingly, the app client 223 may help the selection component 277 to select the top-rated applications 330 from the relevant apps 280 based on the identity of the installed apps to 221 residing within memory of the client device 210.

In still another instance, the selection component 277 may be designed to compile or provided access to a log of user interactions accrued while the user is implementing the search event. Upon reviewing data persisted within the user-interaction log, the selection component 277 may compare information from the log against the predefined characteristics 203 of the application manifest 201 to discover relevant apps 280. Or, the selection component 277 may apply the log information to filter low-rated applications from the relevant apps 280.

In yet another instance, the selection component 277 may be configured to check ranking scale(s) (e.g., popularity-based rankings and/or relevance-based rankings) of apps to distill top-rated applications 330 from the relevant apps 280. These ranking scale(s) may be derived from any number of sources (e.g., the app ratings forum 292 of FIG. 2, data logged from general searching and/or downloading, app-centric blogs, articles, opinion posts, or other reputable sources) and may be employed to effectively dismiss from consideration those apps 280 initially determined irrelevant. For example, if a video game is returned as a relevant app 280, the selection component 277 may, in accordance with ranking scale(s), determine the main version of the video game as being top-rated while listing the remaining versions (e.g., holiday version, special release, and guides and tips) as lower-rated. As a result, a transmission 320 with the top-rated applications 330 may be conveyed for rendering at the web browser 222, while the lower-rated applications may be cached in case the user wants to surface additional applications upon inspecting the search results 295.

Figure 5:
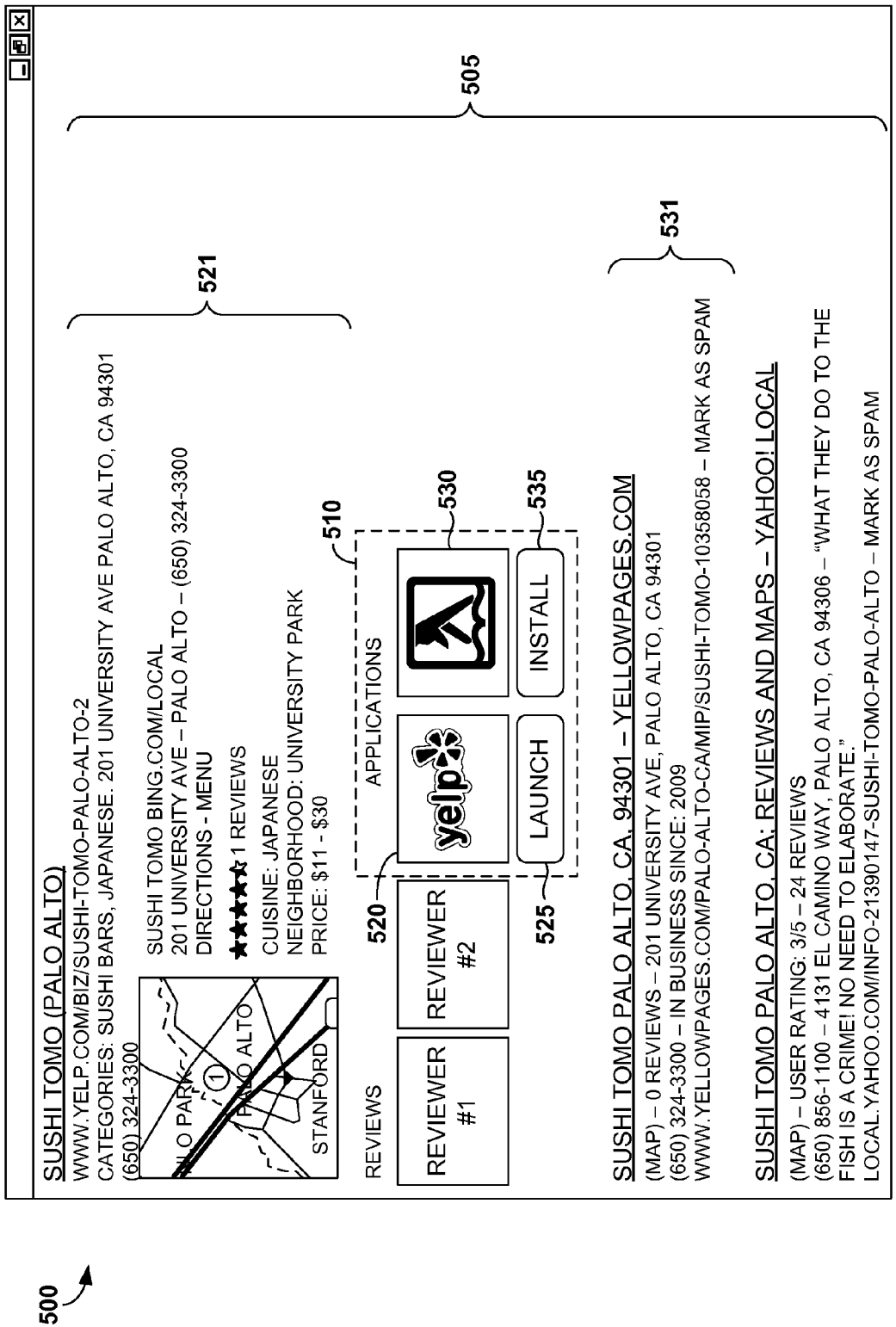
FIG. 5 is a schematic diagram depicting a first illustrative UI display that includes a representation of applications surfaced concurrently with search results, in accordance with embodiments of the invention.

Turning now to FIG. 3, a rendering component 278 may be provided within the search engine 275 for placing a visual representation of at least one application in a location on a layout of a search-result page. As depicted at operation 430, the rendering component 278 is enabled to place representations of the top-rated applications 330 within the search-results page as a function of one or more criteria. For instance, when the criteria indicates the real estate available within the search-results page is limited, the rendering component 278 may elect to restrict the number of top-rated applications 330 rendered at the search-result page. In one instance, the available real estate may be limited when descriptions of websites returned as search results are set to occupy a majority of the space within a display area 600 of FIG. 6. In contrast, if the search-results page is preconfigured with sufficient real estate, then the rendering component 278 may select additional top-rated applications 330 for display. In one instance, the real estate may be deemed sufficient when there exists display space 510 of FIG. 5 allocated and reserved for surfacing applications.

Figure 4A:
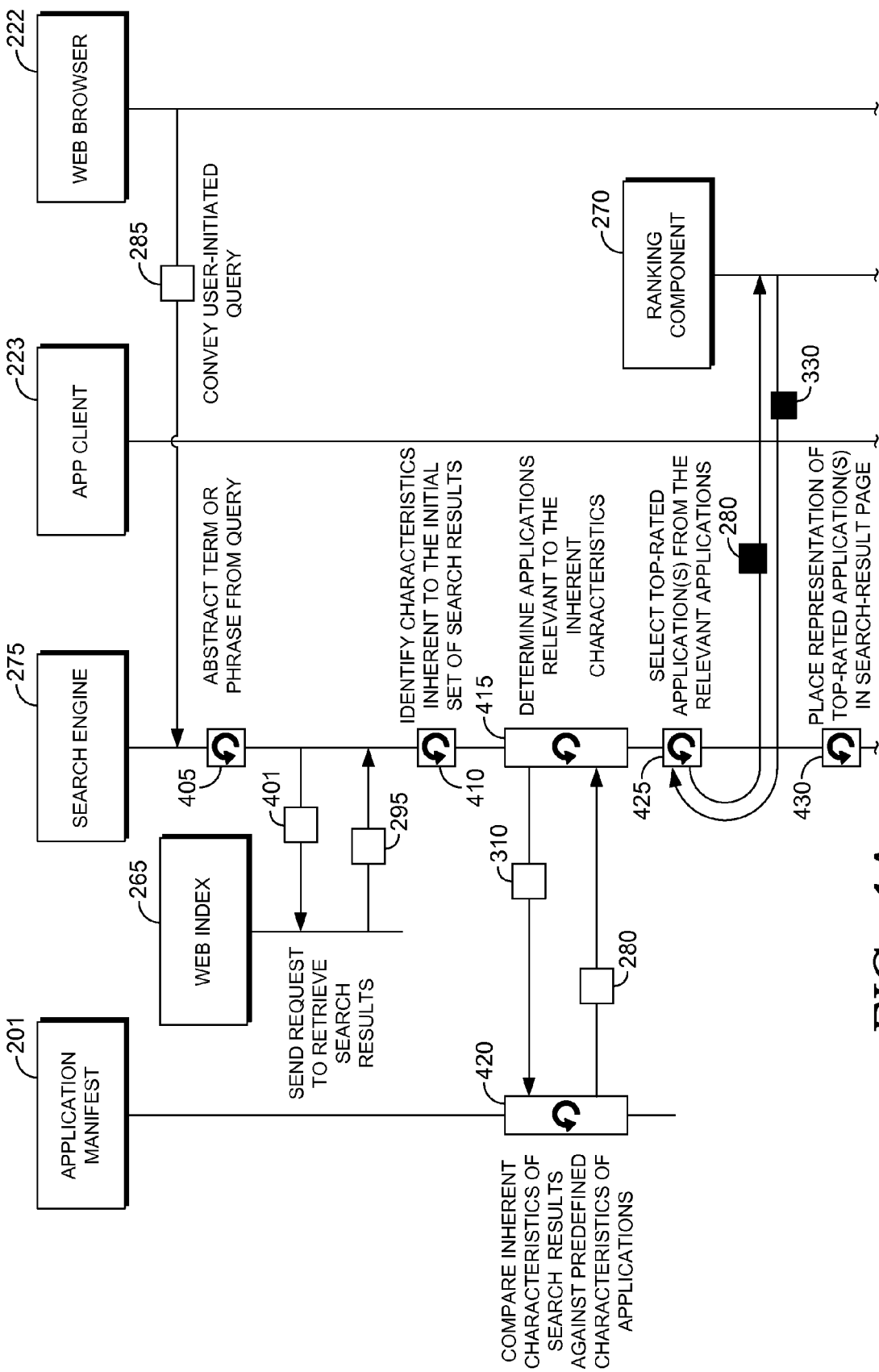
FIGS. 4A-4C depict an operational flow diagram illustrating a high-level overview of a technique for discovering apps and interacting with the discovered apps, in accordance with embodiments of the present invention.
Figure 4B:
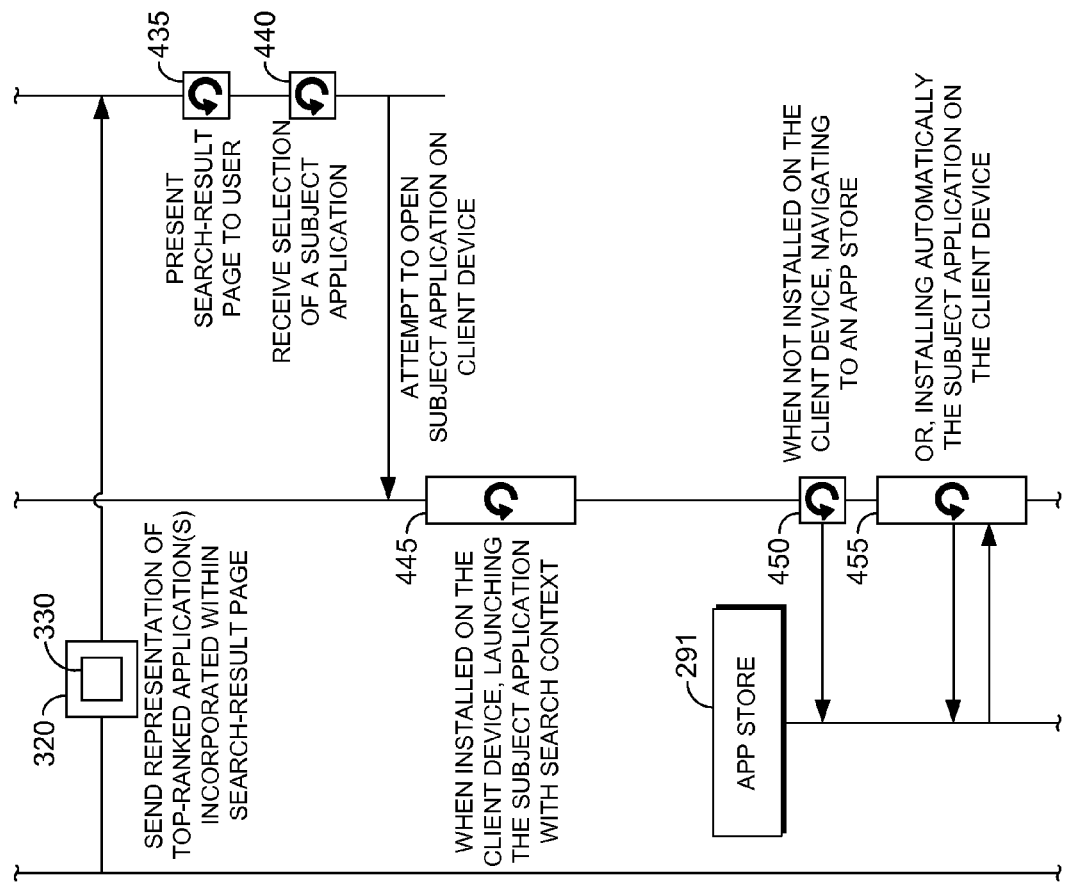

In another embodiment, the criteria used by the rendering component 278 to place representations of the top-rated applications 330 within the search-results page may involve a number of the top-rated applications 330 identified by the selection component 277. For instance, if only two top-rated applications 330 are identified, then just those top-rated applications 330 are sent via transmission 320 to the web browser 222 for incorporation within the search-result page, as illustrated at FIG. 4B.

Upon receipt of the transmission 320, the web browser 222 may present representations of the top-rated applications 330 within a search-result page, as depicted at operation 435. In embodiments, presenting representations of the top-rated applications 330 within a search-result page may comprise placement of the top-rated applications 330 search-results page based on structure of the search results 295. For instance, with respect to FIG. 5 (illustrating a schematic diagram depicting a first illustrative UI display 500), the web browser 222 may surface representations of applications 520 and 530 separately from the search results 521 and 531 within the search-results page 505.

As shown, these applications 520 and 530 may be surfaced within a display space 510 allocated and reserved for applications. As such, this specific area within the search-results page 505 being referred to as the display space 510 is configured to visually separate the applications from the remainder of the search results 521 and 531. Although shown in the middle of the search-results page 505, the display space 510 may be located at the top, bottom, or any other portion of the search-results page 505, as governed by the rendering component 278. In one instance, the size and location of the display space 510, and/or the number of applications indicated therein, is based on the number of top-rated applications 330 selected for inclusion within the search results 295.

However, as shown, the grouping of the applications 520 and 530 within the display space 510 are disassociated from the individual search results 521 and 531 and do not provide context as to why the applications 520 and 530 were selected or how they relate to the query and/or search results 521 and 531. Accordingly, the rendering component 278 may employ the structure of the search-results page 505 when the selection component 277 indicates a high level of confidence in the relevance of the applications 520 and 530 and/or it is readily apparent that the applications 520 and 530 are responsive to the query or satisfy the user's intent behind the ongoing search event.

In other embodiments, placement of the top-rated applications 330 within search-results page may include locating a representation of the applications selected for surfacing proximate to or in association with a particular search result. For instance, with reference to FIG. 6, a schematic diagram depicting a second illustrative UI display is illustrated that includes the display area 600 having representation an application 610 surfaced proximate to a relevant search result 615, in accordance with embodiments of the invention. As shown in FIG. 6, the representation of the application 610 is located proximate to the search result 615. This in-line presentation of the application 610 visually indicates an association between the application 610 and the search result 615. As discussed more fully above, the association between the application 610 and the search result 615 may be maintained within the application manifest 201 of FIGS. 2 and 3, and may be derived from one or more of the following: the web address of the search result 615 exhibits parity with the application 610; the capabilities of the application 610 are relevant to the content of the search result 615; and the characteristics of the search result 615 and the application 610 match a common, predefined entity.

As illustrated at FIG. 6, each of the applications that are presented, including the application 610, have a distinct search result (e.g., search result 615) associated therewith. Typically, this association is communicated to the user by presenting the application in proximity with the search results 615; however, other ways to link search results and applications may be used. Often, a one-to-one relationship between the applications and the search results is presented, in order to provide the user with a consistent search experience. Additional search results and relevant applications will become visible as a user scrolls upward or downward on the exemplary display area 600.

In this way, the structured placement of the application 610 proximate to or in-line with the associated search result 615 implicitly provides the user with information about why the application 610 is relevant to the query. That is, the spatial pairing of the application 610 and the search result 615 within the search-results page 605 intuitively explains to the user how the application was inferred from the query. As a result, if the user is interested in the search result 615, the in-line location of the application 610 may signal to the user that the application 610 may also be of interest for similar reasons. Further, the spatial pairing informs the user about the context of the entry point at which the application 610 will be launched upon selection. For example, if the Cooking Mama® application 610 were launched from the search-results page 605, the proximity of the application 610 to the search result 615 (describing a recipe for chicken pizza) may alert the user that, upon selecting the application 610, the context of the entry point of Cooking Mama® might pertain to chicken pizza.

Returning to FIG. 4B, upon presenting a search-result page to the user as indicated at operation 435, a selection of a subject application listed in the search-result page may be received. In embodiments, the selection may comprise a user-initiated selection (e.g., mouse click or hover action) directed toward a representation of an application surfaced in-line within the search results. For instance, with reference to FIG. 6, a selection made within a boundary of the representation of the application 610 may invoke an action with respect to the application 610. In another instance, with reference to FIG. 5, control buttons 525 and 535 may be provided for launching or installing the applications 520 and 530 respectively. In operation, a selection directed toward the control button 525 may launch the Yelp® application 520 directly from the search-result page 505, while a selection directed toward the control button 535 may install the directory application 530 to the client device 210 to be indexed with the installed apps 221 of FIG. 2.

Upon receiving the selection of the subject application at the web browser 222, the web browser 222 may attempt to open the subject application on the client device 210. As depicted at operation 445, when the subject application is installed on the client device 210, the subject application is launched directly from the search-results page. However, when the subject application is not installed on the client device 210, the web browser 222 may automatically navigate the user to a website that sells the subject application (e.g., app store 291 of FIG. 2), as depicted at operation 450. Or, the app client 223 running on the client device 210 may automatically install the subject application thereon, as depicted at operation 455.

In an exemplary embodiment, as shown in FIG. 2, the app client 223 is designed to detect whether the subject application currently resides on the client device 210 by acting as an interface between the web browser 222 and catalogue(s) of the installed apps 221. In one instance, the app client 223 is configured as a protocol handler and/or system-provided application programming interface (API). Upon an application being installed to the client device 210, the installed application is registered with the protocol handler. Thus, the installed application now can be launched by invoking a protocol known to the protocol handler. In operation, upon receiving an indication that a user has selected the subject application from the search-results page, the web browser 222 may convey the selection indication to the protocol handler (e.g., app client 223) that, in turn, issues an "open" command or invoke call to the installed apps 221. If the subject application is launched in response to the command, then the app client 223 understands the subject application is installed to the client device 210. If the subject application is not launched, then the app client 223 understands the subject application is not installed to the client device 210 and offers the user the option to download the application from the application marketplace 290. As such, by leveraging the protocol-handler capability of the app client 223, the detection of the subject application within the installed apps 221 is relatively efficient and does not require the acquisition of a list of the installed apps 221 for a labor-intensive lookup.

In one instance, the detection of applications that are installed to the client device 210 may be performed incident to adding the top-rated applications to the search results. In this way, the protocol-handler mechanism of the app client 223 may be invoked upon the web browser 222 receiving notification from the search engine 275 that one or more applications are selected for inclusion within the search-results page. The app client 223 may then inspect the installed apps 221 via any know process (e.g., detection using the "open" command) to determine whether the application(s) selected for rendering are actually installed on the client device 210. If so, the app client 223 may instruct the web browser 222 to modify presentational aspects of the application(s) being rendered such that the user is notified the application(s) were previously downloaded to the client device 210 (e.g., modifying the control button 525 to indicate that a click-action applied thereto will launch the application). If not, the app client 223 may instruct the web browser 222 to modify presentational aspects of the application(s) being rendered such that the user is notified the application(s) are not installed to the client device 210 (e.g., modifying the control button 535 to indicate that a click-action applied thereto will install the application).

Figure 4C:
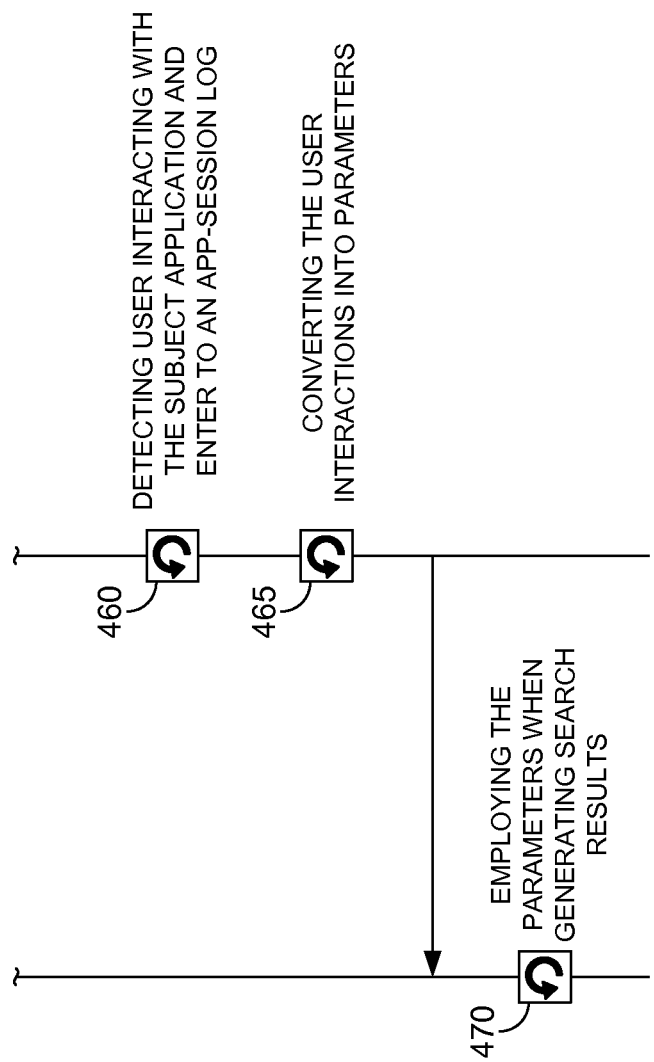

Turning to FIG. 4C, upon the user directing a selection to the subject application that invokes the subject application to launch, context (e.g., the user's interactions with the web browser 222 of FIG. 2) may be transferred to the subject application for establishing an advanced entry point, as opposed to a root entry point that is configured as the default start-up homepage for the subject application. This context may be, in certain circumstances, based upon user interactions with the search engine 275. For instance, the search engine 275 may record the current and/or previous queries within the search event (e.g., utilizing the data stores 230) and derive a context from the terms and phrases within the queries. This context may then be converted into parameters that are plugged-in to the subject application during launch, thereby taking the user directly to the contents, or advanced entry point, relevant to the query.

One way to derive context, as mentioned above, involves parsing at least one query and using the keywords from the query to manipulate the launched application. Another way involves parsing web addresses of search results that are associated with applications selected for presentation. In the example query "Italian restaurants Bellevue reservation," the URL (e.g., "www.urbanspoon.com/Seattle/Bellevue/Italian-Restaurants") returned as part of the search results may provide a context. In this case, the context indicates the user is looking for Italian restaurants in a location of Bellevue, Wash. This context is then converted to parameters and plugged-in to the Urbanspoon® application upon launch. With reference to the example query above, the process of converting into parameters may include recognizing an intent behind keywords within the query and attaching categorizing indicators to the keywords, such as the following: domain=restaurants; cuisine=Italian; location=Bellevue; and task=reservation.

The process of plugging-in the parameters of a search-event context to a launched application may involve the following steps: determining the proper information the application requires to navigate to an advanced entry point; and determining the format of the parameters that will likely be accepted by the application in order to properly interface with the user. For instance, an application may be designed to parse a raw, non-manipulated query or URL without the use of specialized parameters, thus, obfuscating the need to convert the context at the app client 223. In another instance, the app client 223 may be triggered to recognize a preferred format of the launched application in order to properly pass the context as parameters and in order to properly interface with the launched application. As such, the app client 223 may act to bridge a communication gap between the search-event context and launched application.

For example, if a restaurant is searched via a query and the responsive search results include the Yelp® application, the app client 223 may recognize that the Yelp® application requires pre-processing applied to the query prior to passing data to the Yelp® application during launch. In this case, the pre-processing may include extracting a business identifier (ID) from the query and passing the business ID of the searched restaurant to the Yelp® application for entry into an argument designated for the business-ID data type. As a result, the Yelp® application will launch to an advanced entry point that is associated with the searched restaurant.

Further, the launched application may return parameters back to the app client 223 upon the user interacting with the application. These parameters may be employed by the web browser 222 when attempting to generate search results from the search engine 275, as depicted at operation 470 of FIG. 4C. That is, parameters that indicate a context at the launched application (e.g., user actions performed, data entered, or links selected when interfacing with application) may be passed from the launched application to the app client 223 for subsequent use in searching. In operation, upon the user providing information to the launched application during an app session or upon the user terminating the app session, the information is passed to or gathered by the app client 223 for active or passive use with the search engine 275. Active usage includes automatically submitting the context to the search engine 275 in order to generate a new set of search results that incorporate the context from the application. For instance, if a user selects a particular movie in a cinema-based application, the selected movie and/or related information (e.g., movie location, movie show-time, or movie theater) is saved and returned to the search engine 275 for further use. This further use may include generating a new set of search results that are tailored to the selected movie (e.g., a restaurant or parking lot near the theater of the movie, or a director of a movie).

Generally, passive usage includes storing the context for eventual use at appropriate times. For instance, the web browser 222 may append some or all of the context to a subsequent query without the user's knowledge in order to further personalize the search results. Or, the context may be used to modify a user profile maintained and updated at the data stores 230. The user profile may then be intermittently employed to improve the relevance of the subsequent searches.

Turning now to FIG. 9, an overall flow diagram of a method 900 for surfacing one or more applications as a function of search results is shown, in accordance with embodiments of the invention. Although the terms "step" and/or "block" may be used herein to connote different elements of methods employed, the terms should not be interpreted as implying any particular order among or between various steps herein disclosed unless and except when the order of individual steps is explicitly described. Initially, the method 900 comprises the steps of receiving a query submitted at a search engine (see block 902) and employing a keyword (e.g., term or phrase) of the query to generate an initial set of search results (see block 904). The method 900 may further comprise identifying characteristic(s) of a subject result of the initial set of search results (see block 906) and determining application(s) that are relevant to the characteristic(s) (see block 908).

This determination of application(s) that are relevant to the subject result's characteristics may include one or more of the following steps: accessing an application manifest that includes a mapping between applications and predefined characteristics (see block 910); comparing the characteristics of the subject result against the predefined characteristics of the application manifest to determine a match (see block 912); and, when a match exists between the characteristics of the subject result and the predefined characteristics of the application manifest, identifying the application(s) associated with the matched predefined characteristics as being relevant to the subject result (see block 914). These identified application(s) may be presented on display in response to the query, as depicted at block 916. In a particular instance, presenting may involve integrating the application(s) within the initial set of search results (see block 918) and surfacing the integrated application(s) concurrently with the initial set of search results on the UI display (see block 920).

With reference to FIG. 10, an overall flow diagram is shown illustrating a method 1000 for surfacing at least one application during review of a web page, in accordance with embodiments of the invention. The discussion of this method 1000 will coincide with the discussion of a third illustrative UI display illustrated in FIG. 7 that includes a display area 700 exposing application information 730 and link(s) 725 overlaying content 705 of a web page, in accordance with embodiments of the invention. The method 1000 may initially involve rendering a web page or document with the content 705, or text, within the display area 700 (e.g., browser window 225 of FIG. 2) on a UI display of a computing device (see block 1002).

Figure 7:
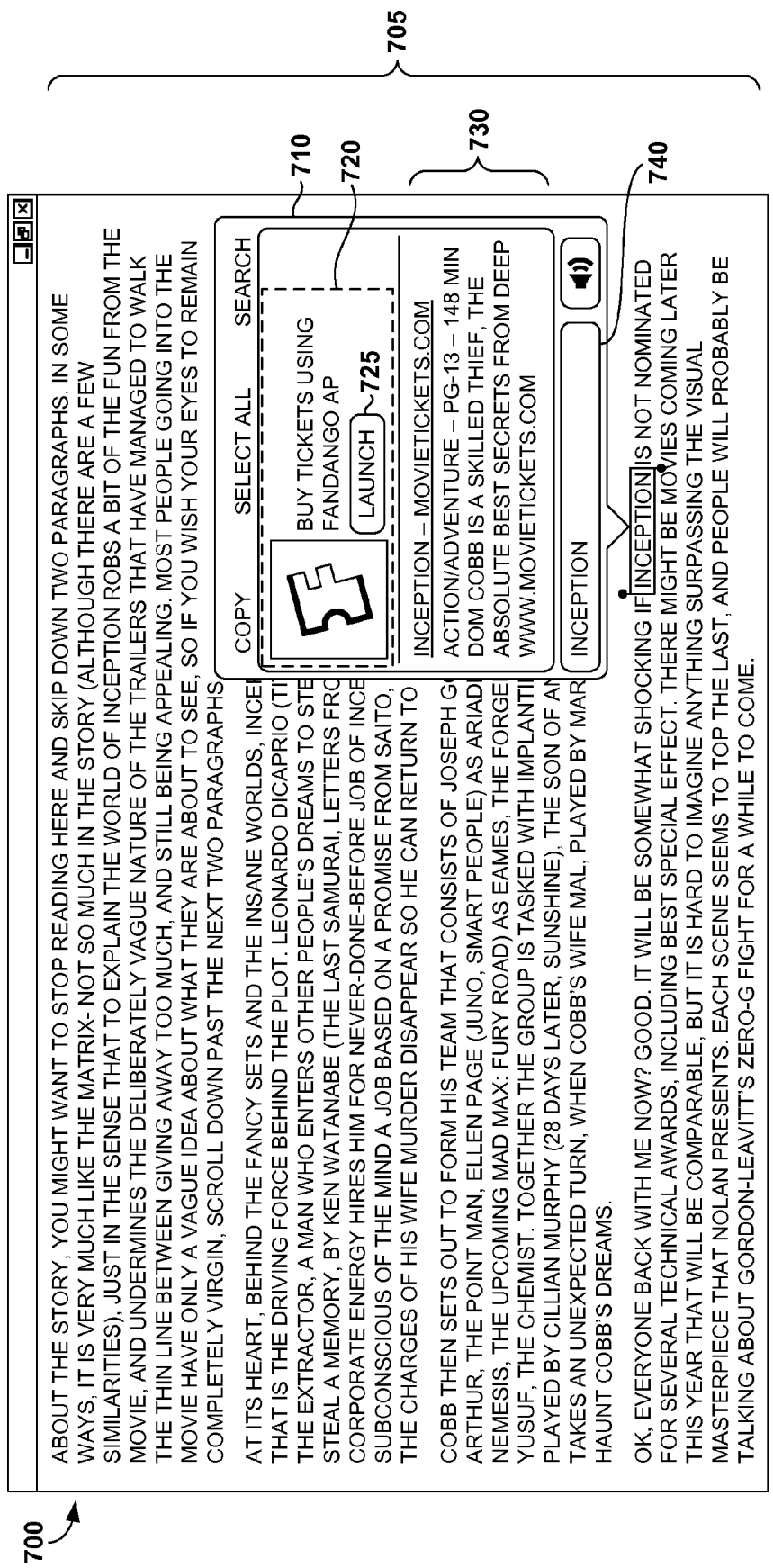
FIG. 7 is a schematic diagram depicting a third illustrative UI display that includes a display area configured for exposing application information and for overlaying content of a web page, in accordance with embodiments of the invention.

In instances, the method 1000 may include the steps of receiving a user-initiated selection of a term or phrase within the content 705 (see block 1004). As illustrated, the selection of the term or phrase (e.g., "inception") may occur via one of various ways, such as a word-finder tool 740 or manually highlighting. In response to the selection, the application(s) 720 that are relevant to the term or phrase are determined (see block 1006). This determination of the relevant application(s) 720 may be carried out by any of the processes described above, such as the employment of the application manifest 201 of FIG. 2. These relevant application(s) 720 may then be presented in a pop-up display window 710 that overlays at least a portion of the display area 700 (see block 1008). As illustrated in FIG. 7, the display window 710 includes the application information 730, a representation of the application 720, and the link 725 to the application 720.

Various embodiments of the invention have been described to be illustrative rather than restrictive. Alternative embodiments will become apparent from time to time without departing from the scope of embodiments of the inventions. It will be understood that certain features and subcombinations are of utility and may be employed without reference to other features and subcombinations. This is contemplated by and is within the scope of the claims.

The invention claimed is:

1. One or more computer-readable media having embodied thereon computer-executable instructions that are executed to perform a method for surfacing one or more applications as a function of search results, the method comprising:
receiving a query submitted at a search engine;
employing a term or phrase of the query to generate an initial set of search results;
selecting a subject result of the initial set of search results;
identifying one or more characteristics of the subject result of the initial set of search results, wherein the one or more characteristics of the subject result represent attributes of a website that is associated with the subject result;
determining at least one application that is relevant to the one or more characteristics of the subject result such that the one or more characteristics of the subject result associate the website with the at least one application, the at least one application being software designed to perform one or more tasks desired by a user; and
presenting the at least one application on a user-interface (UI) display in response to the query.

2. The media of claim 1, wherein presenting the at least one application on a UI display comprises:
   integrating the at least one application within the initial set of search results; and
   surfacing the at least one integrated application concurrently with the initial set of search results on the UI display.

3. The media of claim 2, wherein integrating the at least one application within the initial set of search results comprises placing the at least one application proximate to the subject result within a layout of a search-result page.

4. The media of claim 2, wherein integrating the at least one application within the initial set of search results comprises placing the at least one application in an area of a layout of a search-results page designated for surfacing applications.

5. The media of claim 1, wherein determining at least one application that is relevant to the one or more characteristics comprises:
   accessing an application manifest, wherein the application manifest includes a mapping between applications and predefined characteristics; and
   comparing the characteristics of the subject result against the predefined characteristics of the application manifest to determine a match.

6. The media of claim 5, the method further comprising, when a match exists between the characteristics of the subject result and the predefined characteristics of the application manifest, identifying the at least one application associated with the matched predefined characteristics as being relevant to the subject result.

7. The media of claim 5, wherein the predefined characteristics of the application manifest include a web address, and wherein an application associated with the web address exhibits parity with a website reachable by the web address.

8. The media of claim 5, wherein the predefined characteristics of the application manifest include capabilities of an application exposed by an application-developer, and wherein the subject result matches the application capabilities when the application capabilities are relevant to content of the subject result.

9. The media of claim 5, wherein the predefined characteristics of the application manifest include a truncated uniform resource locator (URL), and wherein comparing the characteristics of the subject result against the predefined characteristics comprises:
   normalizing a URL associated with the subject result from a specific page locator to a generic site locator; and
   comparing the generic site locator against the truncated URL to determine a match.

10. The media of claim 5, wherein the predefined characteristics of the application manifest include an entity, wherein the entity comprises a person, place, or thing represented by a particular online description, and wherein comparing the characteristics of the subject result against the predefined characteristics comprises:
    identifying which entity corresponds with the set of initial search results; and
    comparing the identified entity against the entity of the application manifest to determine a match.

11. The media of claim 5, wherein the predefined characteristics of the application manifest include a task, wherein the task represents a sequence of user-actions carried out during a search event, and wherein comparing the characteristics of the subject result against the predefined characteristics comprises:
    tracking, via a log, a user's interactions taken by the user prior to submitting the query;
    targeting the task using the tracked user interactions; and
    selecting for display at least one application mapped to the task.

12. The media of claim 1, wherein presenting the at least one application on a UI display comprises presenting a control button proximate to a visual representation of the at least one application, and wherein, upon selection, the control button is configured to invoke an action with respect to the at least one application.

13. The media of claim 12, wherein the action invoked upon selection of the control button comprises launching the at least one application, navigating to an online store that offers the at least one application for sale, or installing the at least one application to a device that is currently presenting the UI display.

14. A computer system for selecting at least one application using one or more characteristics of search results, the computer system comprising a processing unit coupled to a computer-storage medium, the computer-storage medium having stored thereon a plurality of computer software components executable by the processing unit, the computer software components comprising:
    an application manifest comprising a listing of applications mined from an application marketplace, wherein the applications within the listing are mapped to predefined characteristics;
    a search engine for generating an initial set of search results as a function of a query submitted by a user;
    a characteristic-matching component for identifying a high-ranking one of the initial search results as a subject result, and for comparing characteristics associated with the subject result against the predefined characteristics of the application manifest, wherein the characteristics of the subject result represent attributes of a website associated with the subject result; and
    a selection component for selecting the at least one application listed in the application manifest that is associated with the predefined characteristics matching the associated characteristics of the subject result, and storing the at least one application as a candidate for concurrent display as a digital image representation of the at least one application with the initial set of search results, wherein the at least one application that is relevant is application software designed to perform one or more tasks related to the query for the user, and wherein the one or more characteristics of the subject result associate the website to the at least one application.

15. The system of claim 14, wherein the search engine is further configured to receive the query and to detect other interactions of users when implementing search events.

16. The system of claim 15, further comprising an index engine to mine applications, and to construct and maintain the mapping between the mined applications and the predefined characteristics.

17. The system of claim 14, further comprising a rendering component for placing a visual representation of the at least one application in a location on a layout of a search-result page proximate to the subject result.

18. The system of claim 14, wherein the predefined characteristics comprise abstract objects that describe a respective intent of a user when implementing a search event.

19. The system of claim 18, wherein the selection component is further configured to compile a log of user interactions while the user is implementing the search event, and to compare information from the log against the predefined characteristics of the application manifest.

20. A computerized method carried out by a search engine running on a processor for surfacing at least one application during review of a web page, the method comprising:
- providing the web page with content currently rendered on a user-interface (UI) display of a computing device;
- receiving a user-initiated selection of a term or phrase within the content of the web page that is currently rendered on the UI display of the computing device for surfacing the at least one application that is relevant;
- determining, in response to the selection, the at least one application that is relevant to the user selected term or phrase, wherein the at least one application that is relevant is application software designed to perform one or more tasks related to the user selected term or phrase for the user when executed by the user; and
- presenting the at least one application in a display area, wherein the display area overlays at least a portion of the content of the web page.

\* \* \* \* \*